United States Patent [19]

Kubota et al.

[11] Patent Number: 5,086,263
[45] Date of Patent: Feb. 4, 1992

[54] BI-AXIAL SYNCHRONOUS DRIVING APPARATUS

[75] Inventors: Saburo Kubota, Katano; Hirotaka Mega, Kadoma; Yasuhiro Kametani, Neyagawa, all of Japan

[73] Assignee: Matsushita Electric Industrial Co., Ltd., Osaka, Japan

[21] Appl. No.: 634,552

[22] Filed: Dec. 27, 1990

[30] Foreign Application Priority Data

Dec. 29, 1989 [JP] Japan .................................. 1-341535

[51] Int. Cl.$^5$ .............................................. G05B 11/00
[52] U.S. Cl. ............................ 318/568.11; 318/568.1; 318/625; 318/609; 364/513; 901/20
[58] Field of Search ............... 318/609, 610, 615, 616, 318/618, 625, 568.01, 568.02, 571, 572, 560–630; 364/513; 901/3, 9, 12, 15–23

[56] References Cited

U.S. PATENT DOCUMENTS 4,714,400 12/1987 Barnett et al. ...................... 318/625
4,999,557 3/1991 Inoue .................................. 318/609

Primary Examiner—Paul Ip
Attorney, Agent, or Firm—Wenderoth, Lind & Ponack

[57] ABSTRACT

A bi-axial synchronous driving apparatus which includes: a set of motors for respectively driving two axes; rotation detecting devices for detecting rotational positions of the respective motors; a set of deviation counters to which a common position instruction signal and detection signals of the respective rotation detecting devices are applied; a correcting unit to which deviation signals outputted from the respective deviation counters are applied, so as to form correction signals with respect to the respective deviation signals based on an integration of a difference between each one of the deviation signals and the other corresponding deviation signal; a set of adding devices for adding the deviation signals outputted from the respective deviation counters to the correction signals; and a set of driving devices for driving the respective motors based on control signals outputted from said respective adding devices.

3 Claims, 2 Drawing Sheets

BI-AXIAL SYNCHRONOUS DRIVING APPARATUS

BACKGROUND OF THE INVENTION

The present invention generally relates to a driving arrangement, and more particularly, to a bi-axial synchronous driving apparatus which may be advantageously utilized for a driving apparatus of two axes to be driven in synchronization at high accuracy in an industrial robot or the like.

Conventionally, for example, as an industrial robot for effecting various work with respect to a workpiece at high positional accuracy, there has been proposed an arrangement as shown in FIG. 3, which includes an Y-axis table 31, an X-axis table 32 which can be positioned at any desired position in an Y direction along said Y-axis table 31, and a working head portion 33 which can also be positioned at any desired position in an X direction along said X-axis table 32, with a position recognizing means 34 and working means 35 being provided on said working head portion 33 through a predetermined interval in the X direction.

In the known arrangement as described above, however, since the X-axis table 32 extends over a long distance in the X direction from the Y-axis table 31, even in the presence of a very small inclination on the X-axis table 32, when the working head portion 33 is displaced along the X-axis table 32 after positioning in the Y direction, positional deviation undesirably takes places in the Y direction.

In order to overcome the disadvantage as described above, there has been conceived another arrangement in which a set or pair of Y-axis tables are disposed in a spaced and parallel relation to each other, and opposite ends of an X-axis table are positioned in the Y direction by these Y-axis tables, while a work head portion is adapted to be positioned in the X direction along said X-axis table.

In the arrangement as referred to above, however, there is such an inconvenience that, the X-axis table can not be stably displaced unless the set of Y-axis tables are driven is synchronization with each other at very high accuracy.

Conventionally, for the driving apparatus which synchronously drives the two axes as described above, a construction as shown in FIG.4 has been generally employed. More specifically, in the arrangement in FIG. 4, position instruction signals common with detection signals of pulse generators 43 and 44 for detecting rotational positions of a set of motors 41 and 42 are applied to deviation counters 45 and 46 provided to correspond to the respective motors 41 and 42, and motor driving circuits 47 and 48 for the respective motors 41 and 42 are controlled based on deviation signals between instruction signals and detection signals outputted from deviation counters 45 and 46. Moreover, it is so arranged that the detection signals of the pulse generators 43 and 44 are inputted also to frequency-/voltage (FV) converters 49 and 50, so as to apply output signals therefrom to the motor driving circuits 47 and 48 for effecting speed compensation.

However, in the bi-axial synchronous driving apparatus as explained above, the two motors 41 and 42 are controlled independently of each other with respect to the position instruction so that the deviation between the instructed position and the detected position becomes 0, and therefore, for example even in the case where a large delay in the rotational position should take place only in one motor 41 or 42 in a constant speed driving state by certain circumstances, the other motor 42 or 41 is maintained in the predetermined operating state. Accordingly, the slippage in the synchronization is not quickly eliminated, thus making it difficult to achieve synchronous driving at high accuracy.

SUMMARY OF THE INVENTION

Accordingly, an essential object of the present invention is to provide a bi-axial synchronous driving apparatus which is capable of driving two axes in synchronization with each other at high accuracy, with substantial elimination of disadvantages inherent in the conventional arrangements of this kind.

Another object of the present invention is to provide a bi-axial synchronous driving apparatus of the above described type which is simple in construction and stable in functioning, and can be readily manufactured at low cost.

In accomplishing these and other objects, according to one preferred embodiment of the present invention, there is provided a bi-axial synchronous driving apparatus which includes: a set of motors for respectively driving two axes; a rotation detecting means for detecting rotational positions of the respective motors, a set of deviation counters to which common position instruction signal and detection signals of the respective rotation detecting means are applied; a correcting means to which deviation signals outputted from the respective deviation counters are applied, to thereby form correction signals with respect to the respective deviation signals based on an integration of a difference between each one of the deviation signals and the other corresponding deviation signal; a set of adding means for adding the deviation signals outputted from the respective deviation counters to the correction signals thereof; and a set of driving means for driving the respective motors based on control signals outputted from said respective adding means.

By the arrangement according to the present invention as described above, in the case where a large delay has taken place on the motor for one axis as compared with the motor for the other axis, correction signals are formed with respect to the respective deviation signals based on the integration of the difference between the deviation signal from the deviation counter corresponding to one motor and the deviation signal corresponding to the other motor, and the driving means for the respective motors are controlled based on the signal obtained by adding the deviation signal outputted from the respective deviation counter with the correction signal thereof. Accordingly, a driving current corrected so as to become larger than that based on the deviation signal is applied to the motor of one axis, while, conversely, a driving current corrected so as to be smaller than that based on the deviation signal is impressed to the motor of the other axis, and thus, the synchronous driving state may be achieved quickly.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
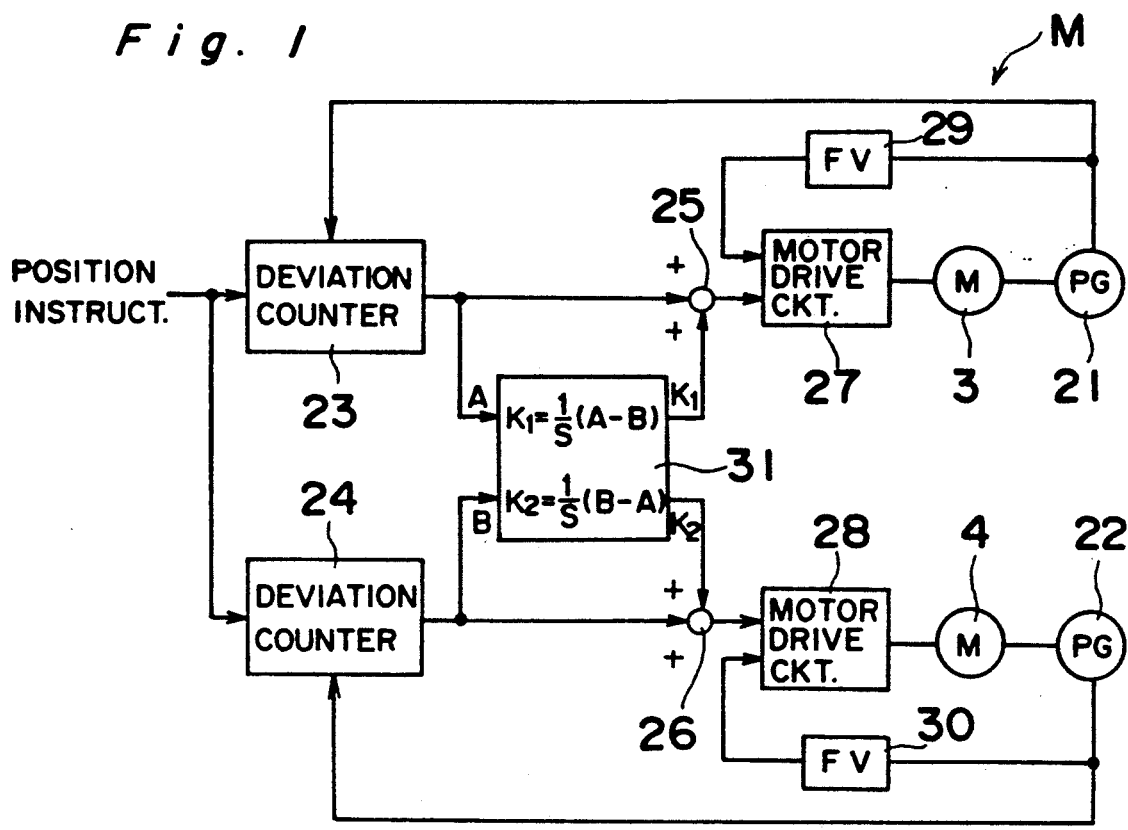
FIG. 1 is a block diagram showing the general construction of a bi-axial synchronous driving apparatus according to one preferred embodiment of the present invention, as applied for driving a set of Y-axis tables of an industrial robot.

Before the description of the present invention proceeds, it is to be noted that like parts are designated by like reference numerals throughout the accompanying drawings.

Figure 2:
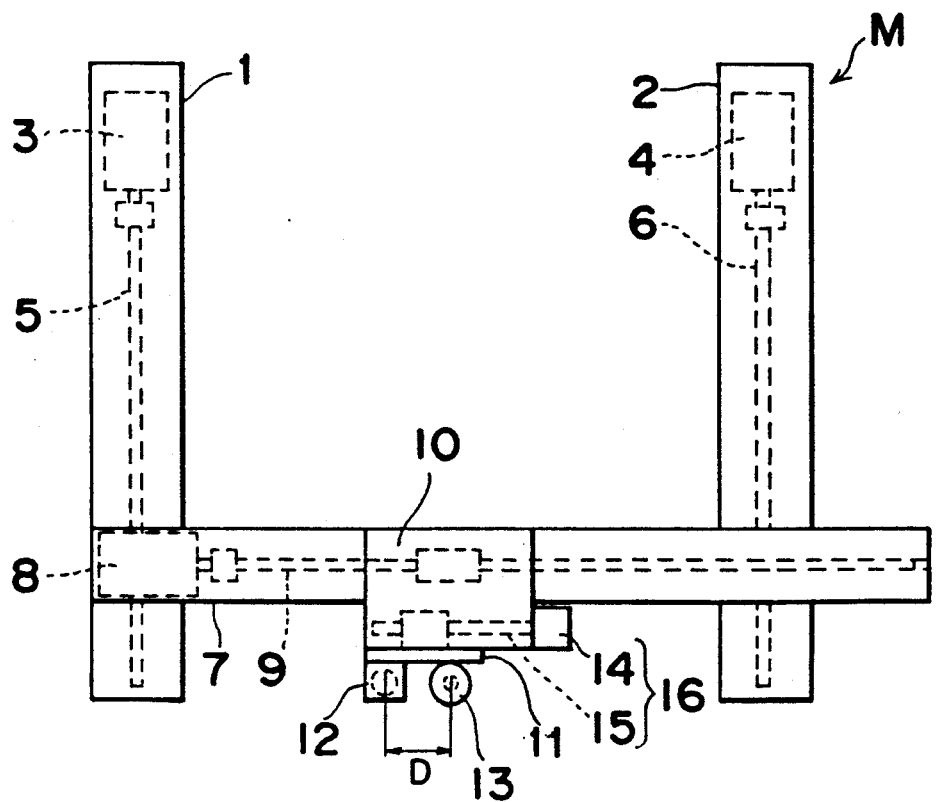
FIG. 2 is a top plane view of the bi-axial synchronous driving apparatus in which the arrangement of FIG. 1 has been employed.
Figure 3:
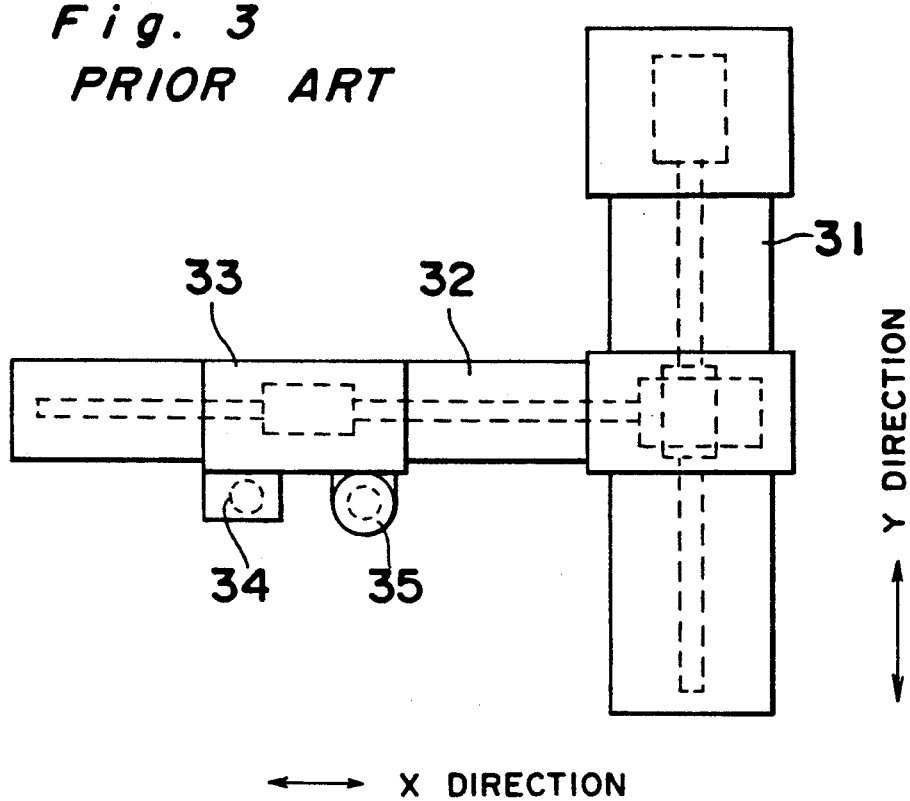
FIG. 3 is a top plan view of a conventional industrial robot (already referred to)
Figure 4:
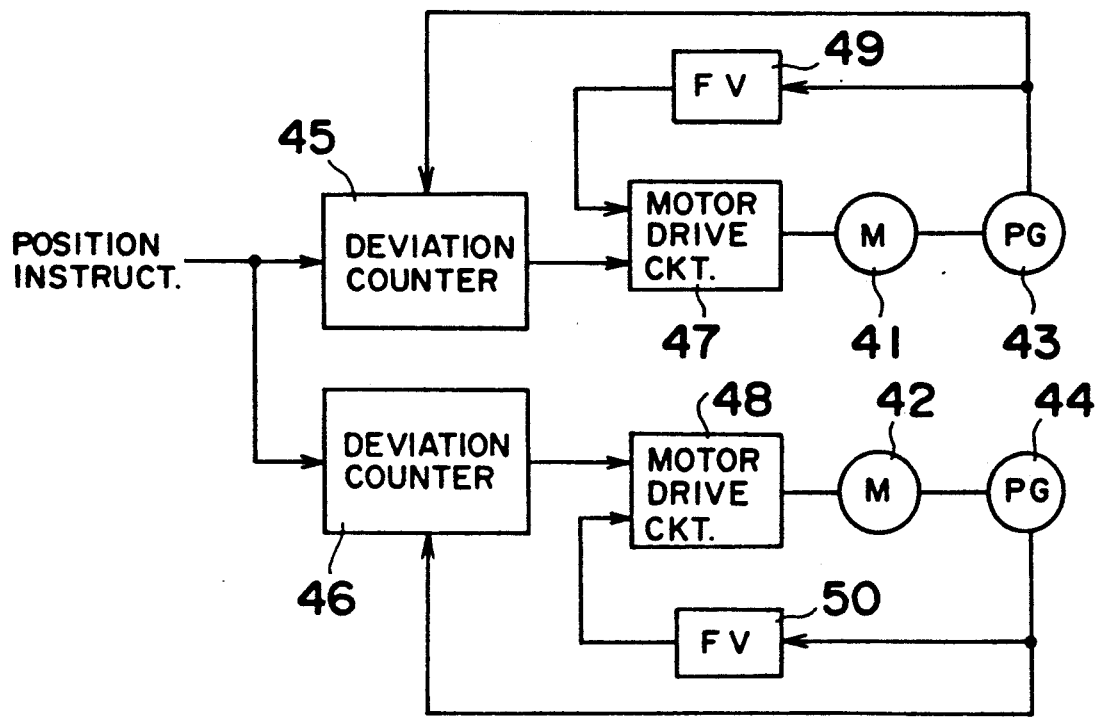
FIG. 4 is a block diagram similar to FIG. 1, which particularly relates to a conventional bi-axial synchronous driving apparatus (already referred to).

Referring now to the drawings, there is shown in FIGS. 1 and 2, a bi-axial synchronous driving apparatus M according to one preferred embodiment of the present invention as applied to Y-axis table driving of an industrial robot having a set or pair of Y-axis tables as illustrated in FIG. 2.

As shown in FIG. 2, the driving apparatus M generally includes a set or pair of Y-axis tables 1 and 2 which are disposed in a parallel and spaced relation from each other and provided with Y-axis lead screws 5 and 6 associated with Y-axis motors 3 and 4 respectively an X-axis table 7 engaged at its opposite ends, with tho Y-axis tables 1 and 2 so as to be displaced in an Y direction along said Y-axis tables 1 and 2 for positioning at any desired position in the Y-direction, and also provided with an X-axis lead screw 9 coupled with an X-axis motor 8, and a movable member 10 to be driven for displacement along the X-axis table 7 so as to be positioned at any desired position in the X-direction.

The movable member 10 is provided with a working head portion 11, on which there are fixedly mounted, through a predetermined interval D therebetween, a position recognizing camera 12 for recognizing the working position and a working tool 13 for effecting a required processing. In the embodiment of FIG. 2, the axis of the position recognizing camera 12 and that of the working tool 13 are accurately positioned on a line parallel to the X-direction.

The working head portion 11 is arranged to be displaceable at high accuracy along the X direction with respect to the movable member 10, and a range for the displacement generally corresponds to the interval D between the position recognizing camera 12 and the working tool 13. There is also provided a precision positioning means 16 including a precision lead screw 15 associated with a motor 14 to displace the working head portion 11 for positioning at high accuracy.

Referring particularly to FIG. 1, the arrangement, for synchronously driving the Y-axis motors 3 and 4 will be described hereinafter.

As shown in FIG. 1, position instruction signals common with detection signals of pulse generators 21 and 22 for detecting rotational positions of the Y-axis motors 3 and 4 are inputted to deviation counters 23 and 24 respectively provided to correspond to the Y-axis motors 3 and 4. Deviation signals A and B between the instruction signals and detection signals outputted from the deviation counters 23 and 24, are respectively applied to adders 25 and 26 and also to a correction circuit 31, while correction signals K1 and K2 outputted from the correction circuit 31 in correspondence to the respective Y-axis motors 3 and 4 are respectively inputted to the adders 25 and 26. From these adders 25 and 26, signals obtained through addition of the deviation signals with the correction signals represented as (A+K1) and (B+K2) are respectively applied to motor driving circuits 27 and 28 for driving and controlling the respective Y-axis motors 3 and 4. It is to be noted here that the detection signals of the pulse generators 21 and 22 are also inputted to frequency/voltage (FV) converters 29 and 30, and output signals therefrom are applied to the motor driving circuits 27 and 28 for effecting speed compensation.

In the correction circuit 31, based on the deviation signals A and B from the respective deviation counters 23 and 24, calculation as follows are effected.

$$K1 = 1/s(A-B)$$

$$K2 = 1/s(B-A)$$

(Where $1/s$ is an integration term), and thus, these values K1 and K2 are outputted as correction signals. In other words, the signals obtained through integration of the difference between the deviation signals A and B from the deviation counters 23 and 24 corresponding to the respective Y-axis motors 3 and 4 and the deviation signals B and A from the other deviation counters 24 and 23 are arranged to be outputted as the correction signals K1 and K2 with respect to the deviation signals A and B.

Subsequently, the functioning of the driving apparatus M as described so far will be explained.

In the case where the processing is to be effected by the working tool 13 with respect to the specified working position, the movable member 10 is displaced in the Y direction and X direction by operating the Y-axis tables 1 and 2, and the X-axis table 7, and further, the working position is detected by the position recognizing camera 12 at the working head portion 11 for positional adjustment, to thereby align the axis position of the camera 12 with the working position at high accuracy.

In the above positioned state of the movable member 10, since the opposite end portions of the X-axis table 7 are properly positioned by the set of Y-axis tables 1 and 2, the X-axis table 7 is in a posture parallel to the X direction at high accuracy even when the Y-axis tables 1 and 2 and the X-axis table 7 have long lengths or strokes, and thus, the working head portion 11 can be displaced in a direction parallel to the X direction at high accuracy.

Furthermore, during the above displacement, by driving the set of the Y-axis tables 1 and 2 in synchronison, the X-axis table 7 may be displaced by maintaining its posture directed parallel to the X direction. Moreover, during the synchronous driving of the Y-axis motors 3 and 4 based on the positional instruction, for example, if a delay in the rotational position takes place in one of the Y-axis motor 3 with respect to the rotational position of the other Y-axis motor 4, the deviation signal B. Thus, in one of the Y-axis motors 3, the motor driving circuit 27 is controlled based on the signal in which the deviation signal A thereof is added to the positive correction signal K1 based on the difference (A−B) with respect to the other deviation signal B, while in the other of the Y-axis motor 4, the motor driving circuit 28, is controlled based on the signal in which the deviation signal B thereof is added with the negative correction signal K2 based on the difference (B−A) with respect to the other deviation signal A. Therefore, to the one Y-axis motor 3, a driving current which has been corrected to become larger than that based on its deviation signal A is impressed, while on the contrary, to the other Y-axis motor 4, a driving current which has been corrected to become smaller than that based on its deviation signal B is applied, and as a result, the slippage in the rotational positions between the Y-axis motors 3 and 4 is quickly eliminated, to thereby achieve the synchronous driving state at high accuracy. Additionally, according to the foregoing embodiment, since the correction signal is arranged to be obtained through integration of the difference of the deviation signals, there is no possibility of dissipation of the control system, thus providing a stable control. The arrangement may, for example, be so modified to use a time constant T for multiplication by $1/T$.

After positioning the X-axis table at the predetermined position in the Y-direction so as to be parallel to the X direction at high accuracy, the working head portion 10 is accurately displaced through the interval D between the axis position of the position recognizing camera 11 and that of the working tool 12 by the precision positioning means 15, whereby the working tool 12 may be aligned with the working position at high accuracy. By operating the working tool 12 under the above state, the processing may be carried out at a high positional accuracy.

As is clear from the foregoing description, according to the bi-axial synchronous driving apparatus of the present invention as described so far, it is so arranged that, when a large delay takes place in the motor for one axis as compared with that for the other axis, the driving means for each motor is controlled by the signal in which the correction signal formed based on the difference between the deviation signal corresponding to one motor and the deviation signal corresponding to the other motor is added to the deviation signal, and therefore, a driving signal corrected to become larger than that based on the deviation signal is applied to the motor for one axis, while conversely, a driving signal corrected to become smaller than that based on the deviation signal is impressed to the motor for the other axis, and thus, the synchronous driving state may be quickly achieved, thus making it possible to effect the synchronous driving at high accuracy.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A bi-axial synchronous driving apparatus which comprises: a set of motors for respectively driving two axes; a rotation detecting means for detecting rotational positions of the respective motors; a set of deviation counters for receiving a common position instruction signal and detection signals of the respective rotation detecting means; a correcting means for receiving deviation signals outputted from the respective deviation counters, to thereby form correction signals with respect to the respective deviation signals based on an integration of a difference between each one of the deviation signals and the other corresponding deviation signal; a set of adding means for adding the deviation signals outputted from the respective deviation counters to the correction signals thereof; and a set of driving means for driving the respective motors based on control signals outputted from said respective adding means.

2. A bi-axial synchronous driving apparatus as claimed in claim 1, wherein said two axes are each in the form of Y-axis tables disposed in a Y direction in a spaced and parallel relationship from each other, and are provided with said motors associated with lead screws.

3. A bi-axial synchronous driving apparatus as claimed in claim 1, wherein said rotation detecting means are pulse generators.

* * * * *